United States Patent
Wei et al.

(10) Patent No.: US 7,277,473 B2
(45) Date of Patent: Oct. 2, 2007

(54) METHOD OF PARALLEL INTERFERENCE CANCELLATION AND AN APPARATUS THEREOF

(75) Inventors: Limei Wei, Guangdong (CN); Guolin Wang, Guangdong (CN)

(73) Assignee: Huawei Technologies Co., Ltd. (CN)

(*) Notice: Subject to any disclaimer, the term of this patent is extended or adjusted under 35 U.S.C. 154(b) by 346 days.

(21) Appl. No.: 10/515,704

(22) PCT Filed: May 30, 2003

(86) PCT No.: PCT/CN03/00420

§ 371 (c)(1),
(2), (4) Date: Nov. 23, 2004

(87) PCT Pub. No.: WO03/103202

PCT Pub. Date: Dec. 11, 2003

(65) Prior Publication Data

US 2005/0163198 A1    Jul. 28, 2005

(30) Foreign Application Priority Data

May 30, 2002  (CN) .............................. 02 1 20555

(51) Int. Cl.
*H04B 1/707*  (2006.01)

(52) U.S. Cl. .................................................... 375/148
(58) Field of Classification Search ................ 375/148, 375/144, 346, 349, 130, 140, 147; 370/296.342, 370/303

See application file for complete search history.

(56) References Cited

U.S. PATENT DOCUMENTS

| | | | |
|---|---|---|---|
| 5,887,034 A | 3/1999 | Suzuki | |
| 6,081,516 A * | 6/2000 | Yoshida et al. | 370/342 |
| 6,282,233 B1 * | 8/2001 | Yoshida | 375/148 |
| 6,363,103 B1 * | 3/2002 | Buehrer et al. | 375/148 |
| 6,480,482 B1 * | 11/2002 | Shoji | 370/342 |
| 6,600,729 B1 * | 7/2003 | Suzuki | 370/335 |
| 6,667,964 B1 | 12/2003 | Seki et al. | |
| 2002/0154713 A1 * | 10/2002 | Sparrman et al. | 375/346 |

FOREIGN PATENT DOCUMENTS

| | | |
|---|---|---|
| JP | A-2000115131 | 4/2000 |
| JP | A-2002009737 | 1/2002 |
| WO | WO-A-0189107 | 11/2001 |
| WO | WO-A-0229992 | 4/2002 |

* cited by examiner

*Primary Examiner*—David C. Payne
*Assistant Examiner*—Leon Flores

(57) ABSTRACT

In a method for parallel interference cancellation (PIC) in a mobile communication system, every user signal is processed through multiple stages of PIC to remove multiple address interference (MAI) partly. In any middle stage and final stage, multipath de-spread is made for output signal of last stage to obtain a multipath de-spread result of this stage. The multipath de-spread result of this stage and that of the last stage of a user are combined to obtain a combined multipath de-spread result, which is sent to next stage when it is in a middle stage. Channel estimation and multipath combination are made based on the combined multipath de-spread result to obtain an output of the user. A PIC device is provided for the method. The method and the PIC device may raise SNR of the de-spread result of each user.

9 Claims, 7 Drawing Sheets

--Prior Art--

--Prior Art--

--Prior Art--

--Prior Art--

--Prior Art--

--Prior Art--

--Prior Art--

--Prior Art--

--Prior Art--

METHOD OF PARALLEL INTERFERENCE CANCELLATION AND AN APPARATUS THEREOF

FIELD OF THE TECHNOLOGY

The invention relates generally to wireless communication field, especially to a method for parallel interference cancellation in a cellular mobile communication system and an apparatus thereof.

BACKGROUND OF THE INVENTION

A CDMA system has advantages of large capacity, high service quality and good security etc., so it has become one of the main techniques for development of the third generation mobile communication. Multiple Address Interference (MAI) limits capacity and performance of a CDMA system. Usually, MAI of a certain user is small to other users, but if the number of users is great, the total MAI caused by other users is large. When near-far effect exists, a larger amplitude signal of a certain user makes larger MAI to a user with a weaker signal. In some cases the weaker and useful signal is flooded by the stronger MAI.

Multi-user detection is an enhanced technique to overcome MAI and to raise capacity of a CDMA system. Joint detection of multi-user is made to reduce influence of MAI on performance of a receiver and to raise the system capacity as much as possible.

In multi-user detection technique, the method of parallel interference cancellation takes the expected user signal as a useful signal and signals of other users as interference signals; interference signals of all other users are removed parallelly from the received signal for each user to obtain the expected user signal, and then the expected user signal is detected, in this way the system performance is raised.

FIG. 1 shows a diagram of a traditional receiver with Parallel Interference Cancellation (PIC). The 101 part of the PIC structure includes an MAI estimation and interference cancellation device and N user processing units shown in FIG. 2, wherein N is the number of parallel processing users, i.e. each user corresponds to one user processing unit shown in FIG. 2, respectively. The final stage of the PIC structure 102 includes N processing units shown in FIG. 3.

First stage of the PIC structure 101 takes the baseband signal of the received signal as an input signal of every user; the input signal is processed and an output signal of every user is obtained; the output signal is the next stage input signal of the PIC structure for every user. Second stage of the PIC structure processes the first stage output signal of every user and obtains an output signal of every user that is the input signal of next stage. The process goes on stage-by-stage until the final stage 102, and the output signal of the final stage is the final result of multiple stages of the PIC structure for every user.

Take the user processing-unit as an example, as shown in FIG. 2. The RAKE receiver 103 makes multipath de-spread of an input signal, and takes the de-spread result to make the channel estimation, and then makes multipath combination. The multipath combination result of the RAKE is sent to the hard decision maker 104, and the channel estimation result is sent to the signal regenerator 105. The hard decision maker 104 makes decision for the multipath combination result and sends the decision result to the signal regenerator 105. According to the results of the channel estimation and the decision, the signal regenerator 105 regenerates a signal of the user and sends it to the MAI estimation and interference cancellation device 106. The MAI estimation and interference cancellation device 106 accumulates regenerated signals of other users and calculates the MAI of the user, and then removes the MAI from the received baseband signal to obtain a result that is an input of the user RAKE receiver at the next stage of the PIC structure.

FIG. 3 is a diagram of the final stage of the PIC structure in FIG. 1. Take one user processing-unit as an example. The RAKE receiver of the user 107 de-spreads the input signal; also the RAKE receiver 107 makes channel estimation and multipath combination to obtain the soft output of the user. The soft output of a user is the final result of the multi-stage PIC structure. In a receiver, the soft output of a user is sent to a user decoder for decoding.

There are two methods to improve the traditional parallel interference cancellation.

First method is called a double-layer weighting parallel interference cancellation method, as shown in FIG. 4, that includes multiple stages of PIC structure 201 and a last stage of PIC structure 203. Each PIC structure 201 includes a MAI estimation and cancellation device and N user processing units, as shown in FIG. 5; the final stage PIC structure 203 includes N processing units, as shown in FIG. 3.

FIG. 5 shows a user processing-unit of the double-layer weighting parallel interference cancellation method. In FIG. 5, the RAKE receiver 204 makes multipath de-spread for an input signal, and makes channel estimation with the de-spread result, and then makes multipath combination. The multipath combination result of the RAKE receiver is sent to the hard decision maker 205 and the reliability coefficient generator 208 simultaneously, and the channel estimation result is sent to the reliability coefficient generator 208 and the signal regenerator 206, simultaneously. The hard decision maker 205 makes a decision for the multipath combination result and sends the decision result to the signal regenerator 206. Based on the channel estimation result and the multipath combination result, the reliability coefficient generator 208 calculates reliability coefficients for the decision result made by the hard decision maker, and sends the reliability coefficients to the signal regenerator 206. Based on the decision result, the reliability coefficients and the channel estimation result, the signal regenerator 206 generates a regenerated signal and sends it to the MAI estimation and interference cancellation device 207. The MAI estimation and interference cancellation device 207 accumulates the regenerated signals of other users and calculates the user MAI, and then the user MAI is partly removed from the baseband signal of the user received signal to obtain an input signal for the RAKE receiver of next stage.

The final stage of PIC structure of this improved method is same as the final stage of the traditional PIC method shown in FIG. 3.

The double-layer weighting parallel interference cancellation method guarantees that the decision cost is minimum, and at the same time it compensates statistical deviation of the user signal estimation through part MAI cancellation.

The second method is called a parallel interference cancellation method with a front-back stage combiner.

The multiple stage structure of a parallel interference cancellation method with a front-back stage combiner is shown in FIG. 6, and it includes: first stage 301, the middle stages 302 and last stage 303. In FIG. 6, first stage PIC structure 301 includes: a MAI estimation and interference cancellation device and N user processing units shown in FIG. 7, wherein N is the number of the parallel processed users; a middle stage 302 includes: a MAI estimation and interference cancellation device and N user processing units shown in FIG. 8; and last stage 303 includes N processing units shown in FIG. 9.

Taking a user processing-unit as an example, FIG. 7 is a diagram of the first stage of the PIC structure. In FIG. 7, the RAKE receiver 304 makes multipath de-spread for an input signal, and makes the channel estimation with the de-spread result, and then makes multipath combination; the result of multipath combination is sent to the hard decision maker 305 and the result of channel estimation is sent to the signal regenerator 306. The hard decision maker 305 makes a decision for the multipath combination result and sends the decision result to the signal regenerator 306. Based on the decision result and the channel estimation result, the signal regenerator 306 generates a regenerated signal and sends the regenerated signal to the MAI estimation and interference cancellation device 307. The MAI estimation and interference cancellation device 307 accumulates the regenerated signals of other users and calculates the user MAI, and then the user MAI is removed from the baseband signal of the user received signal to obtain an input signal for the RAKE receiver of the next stage of the PIC structure. In this stage, the multipath combination result of the user and the noise power of the multipath combination result are exported to the front-back stage combiner of the user in next stage.

FIG. 8 shows a middle stage of the PIC method with a front-back stage combiner. In FIG. 8, the RAKE receiver 308 makes multipath de-spread for an input signal, and makes the channel estimation with the de-spread result, and then makes multipath combination. The multipath combination result of the RAKE receiver is sent to the front-back stage combiner 309, and the channel estimation result is sent to the signal regenerator 311. The multipath combination result and noise power from last stage (the stage before this stage) are also sent to the front-back stage combiner 309. The front-back stage combiner 309 first takes the noise power of this stage multipath combination result and the noise power exported from last stage to obtain a combination coefficient, and then according to the combination coefficients the front-back stage combiner combines proportionally the multipath combination result exported from last stage and the multipath combination of this stage; the combined result is sent to the hard decision maker 310. At the same time, said combined result and the noise power of this combined result are sent to the front-back stage combiner of the next stage of this user. The hard decision maker 310 makes decision with said combined result and sends a decision result to the signal regenerator 311; with the decision result and the channel estimation result the signal regenerator 311 generates a regenerated signal and sends the regenerated signal to the MAI estimation and interference cancellation device 312. The MAI estimation and interference cancellation device 312 accumulates the regenerated signals of other users and calculates the user MAI, and then the user MAI is removed from the baseband signal of the user received signal to obtain an input signal for the RAKE receiver of the next stage of the PIC structure.

FIG. 9 shows the final stage of the PIC method with a front-back stage combiner. In FIG. 9, the RAKE receiver 313 makes multipath de-spread for an input signal, and makes the channel estimation with the de-spread result, and then makes multipath combination. The multipath combination result of the RAKE receiver is sent to the front-back stage combiner 314, and the combined result and noise power of the stage that before the final stage and the noise power of the final stage are imported to the front-back stage combiner 314 too. The front-back stage combiner 314 first takes the noise power of this stage and the noise power exported from last stage to obtain a combination coefficient, and then according to the combination coefficient the front-back stage combiner combines proportionally the multipath combination result exported from last stage and the multipath combination result of this stage; the combined result is the final result of the multi-stage PIC structure. In a receiver, the final result is sent to a decoder for decoding.

According to the criteria of maximizing SNR of the combined result, the optimal combination coefficient can be obtained. Nevertheless, calculation of the optimal combination coefficient is very complicated; it is necessary to use the noise power and signal amplitude exported from last stage, the noise power and signal amplitude of the RAKE multipath combination result of this stage, and the correlation coefficient of the noise involved in the RAKE multipath combination result of this stage and the noise involved in the RAKE multipath combination result of last stage.

In order to make a parallel interference cancellation method with a front-back stage combiner easier to implement, usually it is supposed that the noise involved in the RAKE multipath combination result of this stage and the noise exported from last stage are noncoherent. The less optimal combination coefficient is calculated by the noise power of noise exported by last stage and the noise power of the RAKE multipath combination result of this stage.

The parallel interference cancellation method with a front-back stage combiner mentioned above raises performance of the traditional parallel interference cancellation method, but the assumption that noises are noncoherent between two consecutive stages limits performance to be raised further.

SUMMARY OF THE INVENTION

Objective of the invention is to provide a method and a device for parallel interference cancellation, and the method and device raise SNR of the de-spread result of each user, avoid noise power being transferred among stages and noise correlation between two adjacent stages being computed and raise SNR of RAKE multipath combination result, with minimum decision cost and decreasing the statistical deviation of signal estimation.

Technical scheme of the invention is implemented as followings:

A method to offset parallel interference comprises the following steps:

in first stage of PIC, making multipath de-spread, channel estimation and multipath combination for a user input signal by a RAKE receiver, sending a multipath de-spread result to next stage, making estimation and cancellation of Multiple Address Interference (MAI) of the user of this stage based on a multipath combination result and a channel estimation result, and obtaining an output signal of the said user of this stage;

in any middle stage of PIC, making de-spread for output signal of last stage to obtain a multipath de-spread result of this stage, combining the multipath de-spread results of this stage and last stage of the said user to obtain a combined multipath de-spread result, sending the combined multipath de-spread result to next stage;

making channel estimation and multipath combination of this stage based on the combined multipath de-spread result, and then making estimation and cancellation of Multiple Address Interference (MAI) of this stage of the said user based on the multipath combination result and the channel estimation result of this stage, and obtaining an output signal of the said user of this stage;

in final stage of PIC, making de-spread for output signal of last stage to obtain a multipath de-spread result of this stage, combining the multipath de-spread results of this stage and last stage of the said user to obtain a combined multipath de-spread result, making channel estimation and multipath combination based on the combined multipath de-spread result to obtain a soft output of the said user.

The step of combining the multipath de-spread results of this stage and last stage of the said user comprises, combining the multipath de-spread result of this stage and that of last stage by a formula $$Y_{ilc}^{(m)(k)} = Q_i^{(k)} Y_{il}^{(m)(k)} + (1 - Q_i^{(k)}) Y_{ilc}^{(m)(k-1)},$$

wherein, $Y_{il}^{(m)(k)}$ is a de-spread result of $m^{th}$ symbol of $l^{th}$ path of $i^{th}$ user in the $k^{th}$ stage of PIC before combination, and $$Y_{ilc}^{(m)(k-1)}$$

is a de-spread result of $m^{th}$ symbol of $i^{th}$ path of $i^{th}$ user in the former stage; and then $$Y_{ilc}^{(m)(k)}$$

is a combined de-spread result of $m^{th}$ symbol of $l^{th}$ path of $i^{th}$ user in the $k^{th}$ stage of PIC; $Q_i^{(k)}$ is a combined coefficient, $0<Q_i^{(k)}<1$, $Q_i^{(1)}<Q_i^{(2)}< \ldots <Q_i^{(S)}$, wherein S is the number of stages and k is greater than 1.

The method combines proportionally the multipath de-spread results of this stage and last stage to raise SNR of the de-spread result, and then takes the combined result to make channel estimation and multipath combination; in this way propagation of noise power among stages and computation of noise correlation among stages are avoided; at the same time, the SNR of the de-spread result is raised, the decision cost is minimum and the statistical estimation deviation is decreased; therefore the system performance is raised greatly.

A parallel interference cancellation device that is a multiple stages of structure; of which a first stage of the PIC includes N first stage user processing units and a first stage MAI estimation and interference cancellation device, any middle stage of the PIC includes N user processing units and a MAI estimation and interference cancellation device, and a final stage of the PIC structure includes N final stage user processing units; wherein the first stage user processing unit includes a RAKE receiver, a decision unit and a signal regenerator; the RAKE receiver receives an input signal of a user and makes multipath de-spread, channel estimation and multipath combination; a multipath combination result is sent to the decision unit, and a channel estimation result is sent to the signal regenerator, and a multipath de-spread result is exported to a front-back stage combiner of next stage; a decision result of the decision unit is sent to the signal regenerator and a regenerated signal of said signal regenerator is sent to the first stage MAI estimation and interference cancellation device that makes estimation and cancellation of MAI and exports the said user output signal of this stage;

the middle stage user processing unit includes a de-spreader, a front-back stage combiner, a channel estimation and multipath combiner, a decision unit and a signal regenerator; the de-spreader makes multipath de-spread for the said user output of the last stage MAI estimation and cancellation device to obtain a multipath de-spread result of this stage; the front-back stage combiner combines a multipath de-spread result of this stage and that of last stage of the said user to obtain a combined result, and then sends it to the said channel estimation and multipath combiner and a front-back stage combiner of next stage of the said user; a multipath combination result of the channel estimation and multipath combiner is sent to the decision unit, and a channel estimation result of the channel estimation and multipath combiner is sent to the signal regenerator; a decision result from the decision unit is sent to the signal regenerator, and a regenerated signal is sent to the MAI estimation and interference cancellation device of this stage, which makes estimation and cancellation of MAI and exports the said user output signal of this stage;

the final stage user processing unit includes a de-spreader, a front-back stage combiner and a channel estimation and multipath combiner; the de-spreader makes multipath de-spread for the said user output of last stage MAI estimation and cancellation device to obtain a multipath de-spread result of this stage; said front-back stage combiner combines the multipath de-spread result of this stage and that of the last stage of the said user to obtain a combined result, the combined result is sent to the channel estimation and multipath combiner, which makes channel estimation and multipath combination for the combined result and then exports a final output signal of this user.

EMBODIMENTS OF THE INVENTION

The invention will be described in more detail with reference to drawings.

Figure 1:
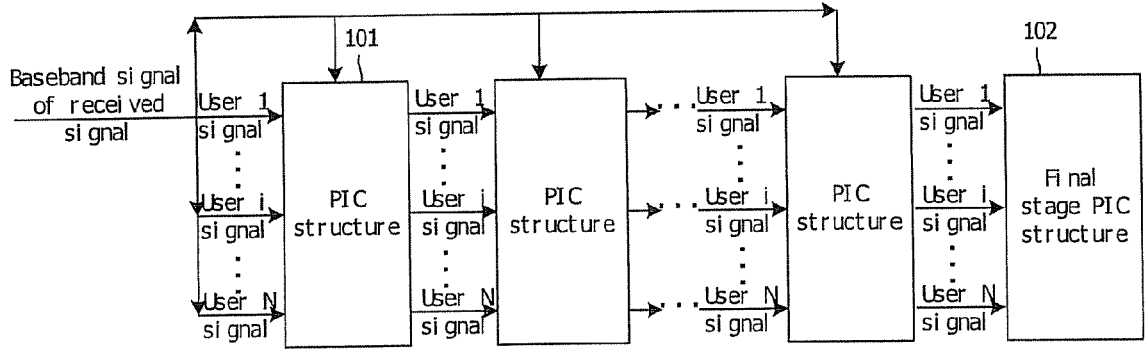
FIG. 1 shows a diagram of multiple stage structure of a traditional parallel interference cancellation (PIC) receiver.
Figure 2:
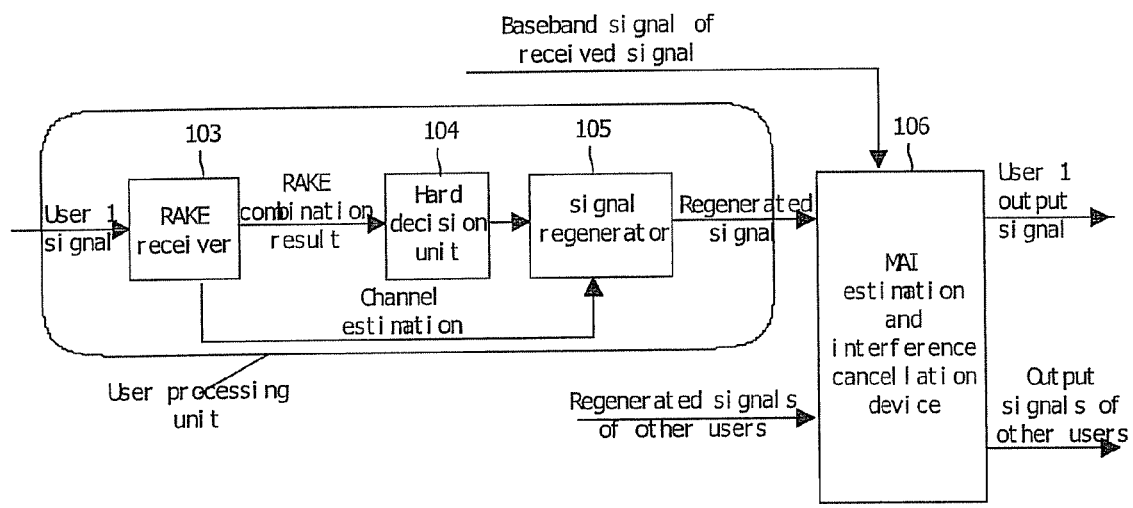
FIG. 2 shows a diagram of one stage of the PIC multiple stage structure in the prior arts, which is an example with one user processing-unit.
Figure 3:
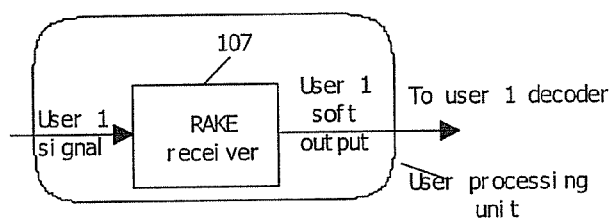
FIG. 3 shows a diagram of the final stage of a user processing-unit of a PIC structure, in the prior art, which is an example with one user processing-unit.
Figure 4:
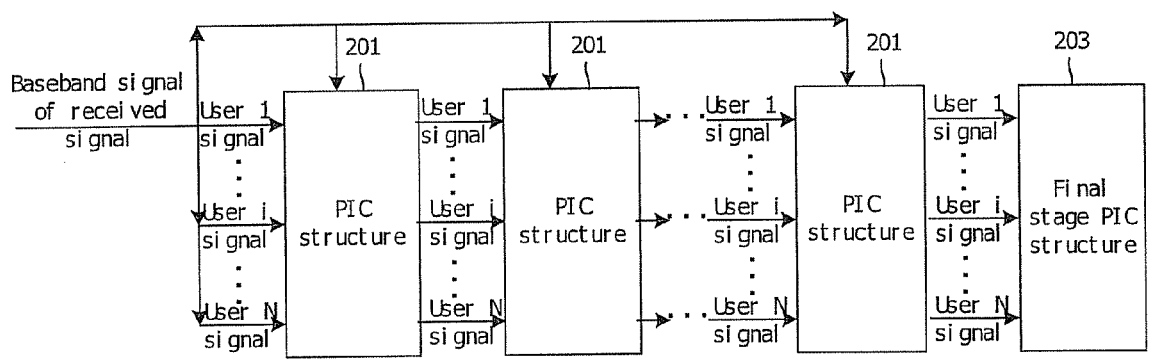
FIG. 4 shows a diagram of multiple stage structure of a known double-layer weighting PIC method.
Figure 5:
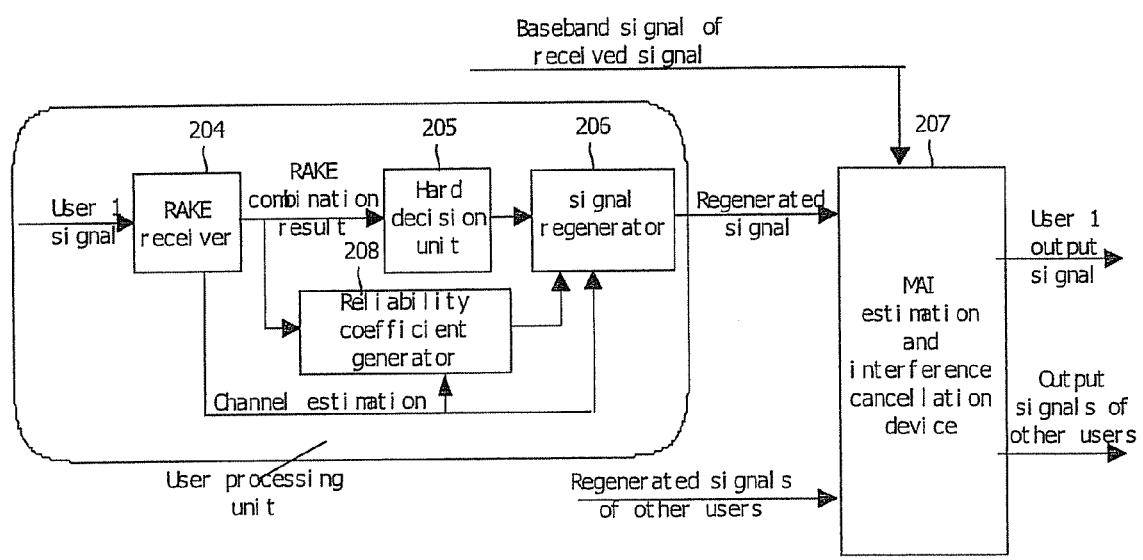
FIG. 5 shows a diagram of one stage for the known double-layer weighting PIC method, which is an example with one user processing-unit.
Figure 6:
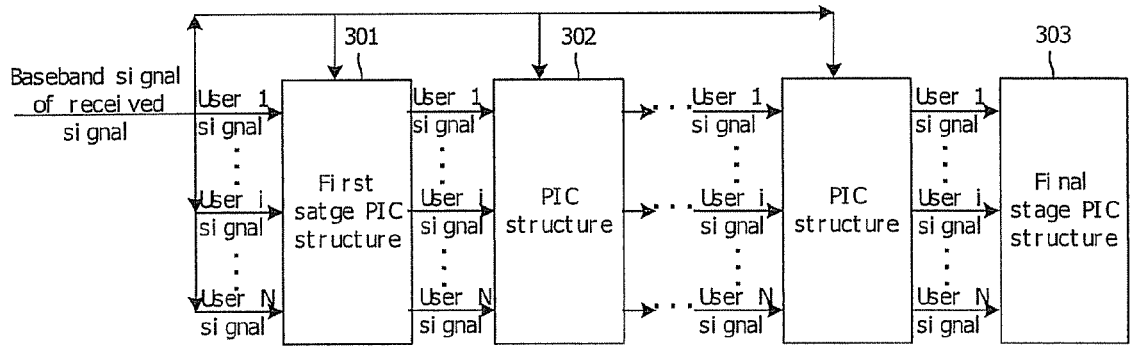
FIG. 6 shows a diagram of multiple stage structure of a known PIC method with a front-back stage combiner.
Figure 7:
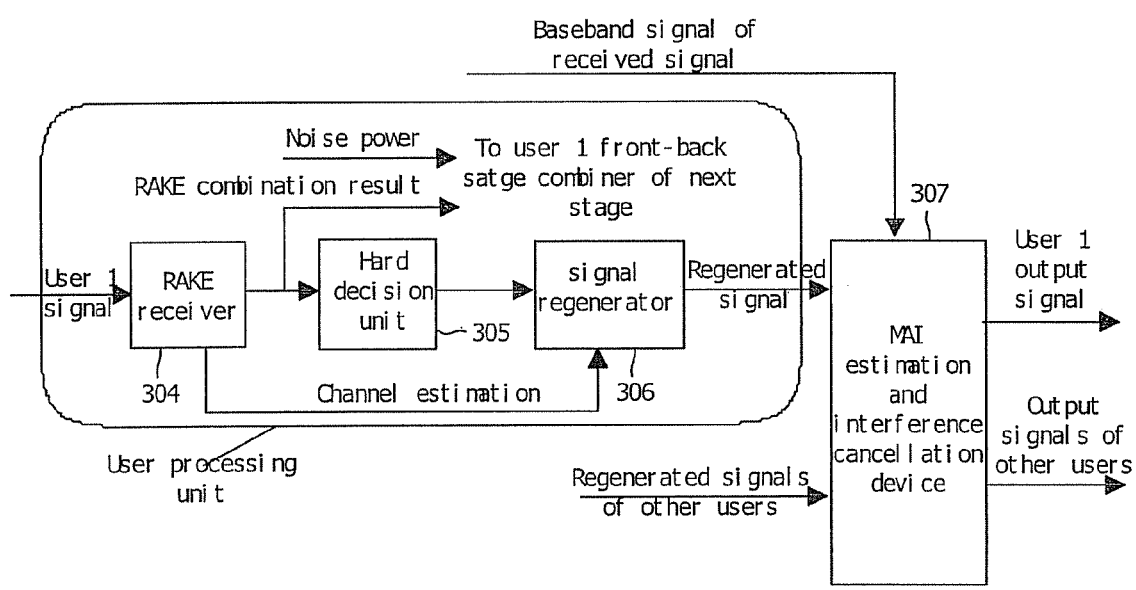
FIG. 7 shows a diagram of the first stage structure for a known PIC method with a front-back stage combiner, which is an example with one user processing-unit.
Figures 8, 9:
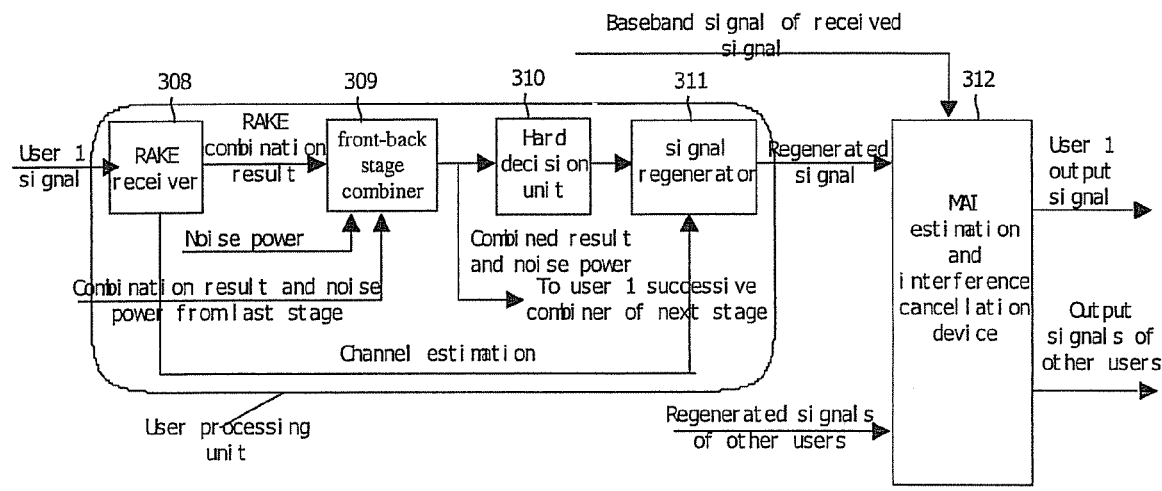
FIG. 8 shows a diagram of the middle stage structure for a known PIC method with a front-back stage combiner, which is an example with one user processing-unit.
FIG. 9 shows a diagram of the final stage structure for a known PIC method with a front-back stage combiner, which is an example with one user processing-unit.
Figure 10:
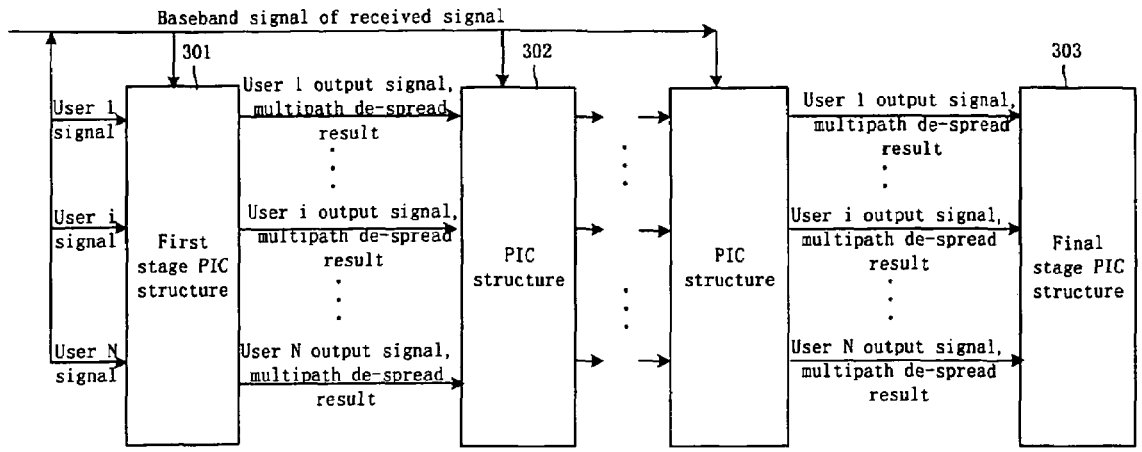
FIG. 10 shows a diagram of a new parallel interference cancellation receiver with multiple stage structure for the invention.

FIG. 10 shows a diagram of multiple stages of PIC structure device of the invention, wherein device 401 is first stage of the PIC structure, device 402 is the middle stage and device 403 is the final stage. In FIG. 10, the first stage 401 includes: a MAI estimation and interference cancellation device and N user processing units shown in FIG. 11, wherein N is the number of the parallel processed users; the middle stage 402 includes: a MAI estimation and interference cancellation device and N user processing units shown in FIG. 12; and the final stage 403 includes N processing units shown in FIG. 13.

A user processing-unit is taken as an example for description in the following.

Figure 11:
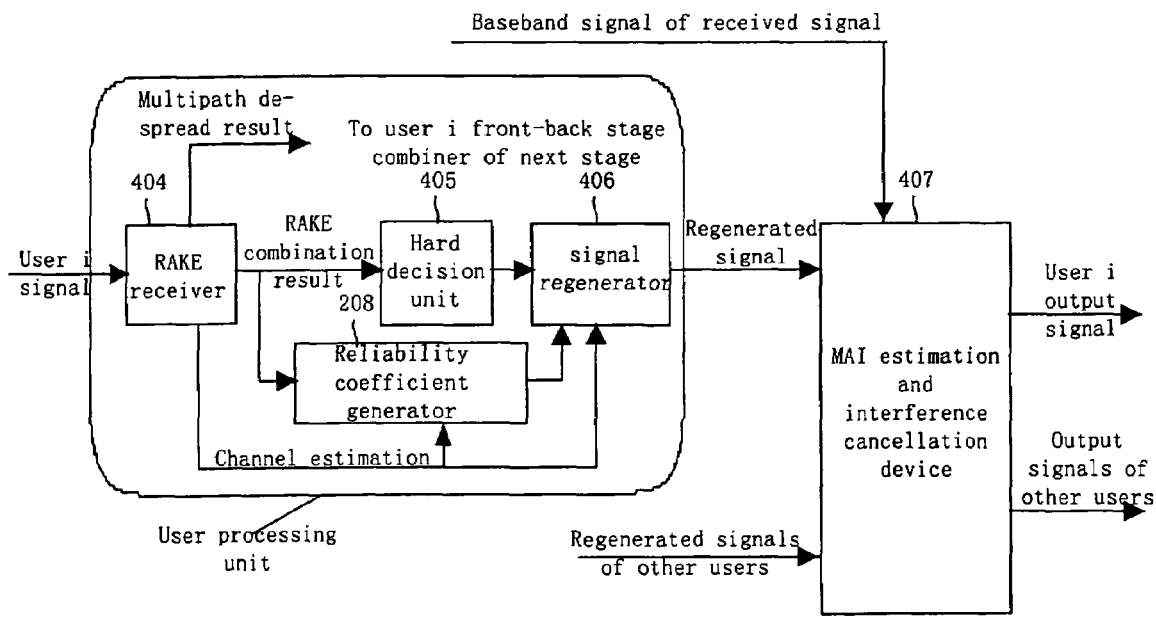
FIG. 11 shows a diagram of the first stage of FIG. 10, which is an example with one user processing-unit.

FIG. 11 is a diagram of the first stage of PIC structure in the invention. In FIG. 11, the RAKE receiver 404 makes multipath de-spread of the baseband signal of a received signal, and makes the channel estimation of the de-spread result, and then makes multipath combination; the channel estimation result is sent to the reliability coefficient generator 408 and the signal regenerator 406 simultaneously, the result of the RAKE combination is sent to the hard decision maker 405 and the reliability coefficient generator 408. The hard decision maker 405 makes a decision for the RAKE multipath combination result and sends the decision result to the signal regenerator 406. The reliability coefficient generator 408 calculates the reliability coefficient of the hard decision result based on the multipath combination result and the channel estimation result, and sends the reliability coefficient to the signal regenerator 406. Based on the decision result, the generated reliability coefficient and the channel estimation result, the signal regenerator 406 generates a regenerated signal and sends the regenerated signal to the MAI estimation and interference cancellation device 407. The MAI estimation and interference cancellation device 407 accumulates the regenerated signals of other users and calculates the user MAI, and then the user MAI is removed partly from the baseband signal of the user received signal to obtain an output signal of this stage that is sent to the de-spread unit of next stage.

Figure 12:
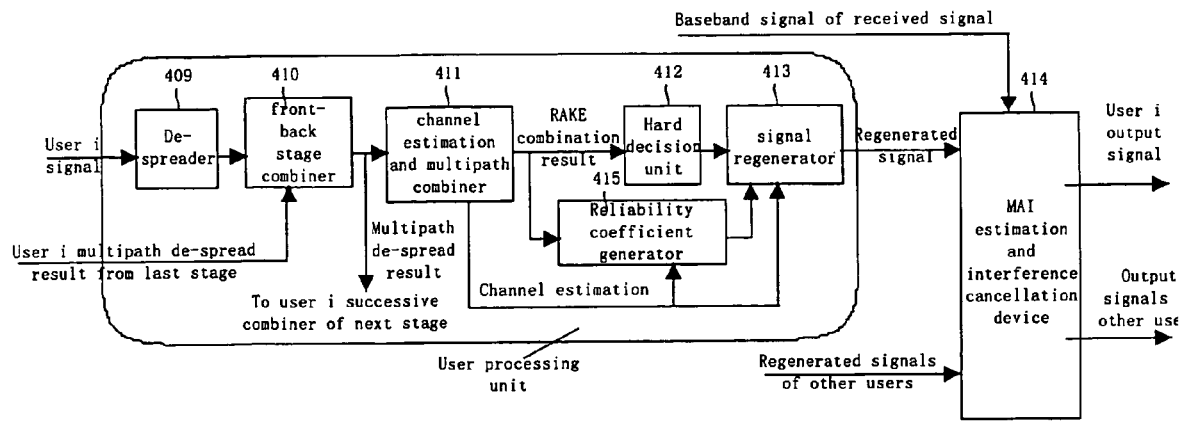
FIG. 12 shows a diagram of a middle stage of FIG. 10, which is an example with one user processing-unit.

FIG. 12 shows one of the middle stages of the PIC. In FIG. 12, the de-spread unit 409 obtains the de-spread result of this stage by de-spreading last stage output signal of the user, and said de-spread result is sent to the front-back stage combiner 410. The front-back stage combiner 410 combines the multipath de-spread result of this stage and the multipath de-spread result of last stage for the user, and the combined result is sent, on the one hand, to the channel estimation and multipath combiner 411 and is exported, on the other hand, to the next stage front-back stage combiner of this user. The channel estimation and multipath combiner 411 makes channel estimation and multipath combination with the multipath de-spread result having been combined, and the estimation result is sent to the reliability coefficient generator 415 and the signal regenerator 413, simultaneously; the multipath combination result is sent to the hard decision maker 412 and the reliability coefficient generator 415, simultaneously.

The hard decision maker 412 makes decision for the multipath combination result and sends the decision result to the signal regenerator 413. The reliability coefficient generator 415 calculates the reliability coefficient of the hard decision result based on the multipath combination result and the channel estimation result, and sends the reliability coefficient to the signal regenerator 413. Based on the decision result, the reliability coefficient and the channel estimation result, the signal regenerator 413 generates a regenerated signal of the user and sends the regenerated signal to the MAI estimation and interference cancellation device 414. The MAI estimation and cancellation device 414 accumulates the regenerated signals of other users and calculates the user MAI, and then the user MAI is removed partly from the baseband signal of the user received signal to obtain an output signal of this stage that is sent to the de-spread unit of next stage.

Figure 13:
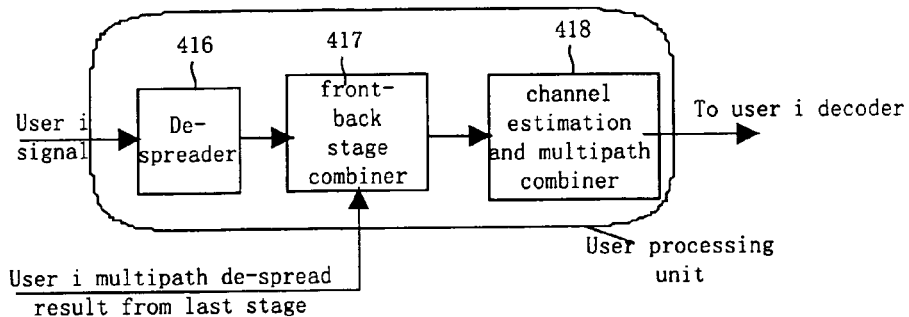
FIG. 13 shows a diagram of the final stage of FIG. 10, which is an example with one user processing-unit.

FIG. 13 shows the final stage of the PIC. In FIG. 13, the de-spread unit 416 makes multipath de-spread of the inputted signal and sends the multipath de-spread result to the front-back stage combiner 417. The front-back stage combiner 417 combines the multipath de-spread result of this stage and the multipath de-spread result of last stage of the user, and the combined result is sent to the channel estimation and multipath combiner 418. The channel estimation and multipath combiner 418 makes channel estimation and multipath combination for the multipath de-spread result having been combined, and the multipath combination result is the final result of the user in the multiple stages of PIC structure. In a receiver, said multipath combination result is sent to a decoder for decoding.

In the following, the $i^{th}$ user signal is taken as an example for detail description of the method of the invention.

Suppose that:

r(t) is the baseband signal of the received signal;

$a_{il}$ is signal attenuation of the $l^{th}$ path of the $i^{th}$ user along a channel, L is number of paths;

$\tau_{il}$ is the time delay of the $l^{th}$ path of the $i^{th}$ user;

$S_i(t)$ is the transmitting signal of the $i^{th}$ user;

N is the number of user signals that are processed in parallel;

$P_i$ is the power of the $i^{th}$ user;

$b_i(t)$ is the symbol sequence of the $i^{th}$ user and $$b_i(t) = \sum_{m=-\infty}^{\infty} a_i^m p(t - mT_b);$$

$a_i^{(m)}$ is the $m^{th}$ symbol of the $i^{th}$ user;

p(t) is a signal pulse with a $T_b$ period;

$c_i(t)$ is the spreading code of the $i^{th}$ user;

Z(t) is a channel noise.

The baseband signal of a received signal is represented in the following formula:

$$r(t) = \sum_{i=1}^{N} \sum_{l=1}^{L} a_{il} S_i(t - \tau_{il}) + Z(t) \qquad (1)$$

$$= \sum_{i=1}^{N} \sum_{l=1}^{L} a_{il} \sqrt{P_i} \, b_i(t - \tau_{il}) c_i(t - \tau_{il}) + Z(t)$$

Suppose, in the first stage of PIC structure, the de-spread result of the $m^{th}$ symbol of the $l^{th}$ path of the $i^{th}$ user is $Y_{il}^{(m)(l)}$, and the de-spread result of the $m^{th}$ symbol of the $l^{th}$ path sent to next stage is $Y_{ilc}^{(m)(1)}$, then $Y_{ilc}^{(m)(1)} = Y_{il}^{(m)(1)}$.

Suppose, in the $k^{th}$ (k>1) stage of the PIC structure, the de-spread result of the $m^{th}$ symbol of the $l^{th}$ path of the $i^{th}$ user is $Y_{il}^{(m)(k)}$, and the de-spread result of the $m^{th}$ symbol of the $l^{th}$ path of the last stage of this user is $Y_{ilc}^{(m)(k-1)}$, then the de-spread result of the $m^{th}$ symbol of the $l^{th}$ path of the $k^{th}$ stage of the $i^{th}$ user can be obtained by the following formula:

$$Y_{il}^{(m)(k)} = \frac{1}{\sqrt{T_b}} \int_{(m-1)T_b+\tau_{il}}^{mT_b+\tau_{il}} \partial r_i^{(k)}(t) c_i^*(t-\tau_{il}) dt$$

Step a: In the first stage of the PIC structure, the RAKE receiver makes multipath de-spread, channel estimation and multipath combination of a user input signal r(t), and outputs said de-spread result to next stage; wherein the multipath combination result of the $m^{th}$ symbol of the $i^{th}$ user can be expressed as the following formula:

$$Y_i^{(m)(k)} = \mu_i a_i^{(m)} + n_i \quad (2)$$

wherein the $Y_i^{(m)(k)}$ represents the multipath combination result of the $m^{th}$ symbol of the $i^{th}$ user at the $k^{th}$ stage of the PIC structure; the $\mu_i$ is a real number related to signal attenuation along a channel; the $n_i$ is Gaussian white noise that obeys Normal Distribution $N(0, \sigma_i^2)$.

Suppose the hard decision result of the $m^{th}$ symbol is $\hat{a}_i^{(m)(k)}$, and according to the multipath combination result the calculation of a hard decision is made by the following formula:

$$\hat{a}_i^{(m)(k)} = sgn\{Y_i^{(m)(k)}\} \quad (3)$$

According to the multipath combination result and the channel estimation result, the reliability coefficient $f_i^{(m)(k)}$ of $\hat{a}_i^{(m)(k)}$ is calculated by the following formula:

$$f_i^{(m)(k)} = \tanh\left\{\frac{\mu_i |Y_i^{(m)(k)}|}{\sigma_i^2}\right\} \quad (4)$$

According to the decision result, reliability coefficient and channel estimation result, the regenerated signal $g_i^{(k)}(t)$ is calculated with the following formula:

$$g_i^{(k)}(t) = \sum_{i=1}^{L} A_{il} \sum_{n=\infty}^{\infty} f_i^{(n)(k)} \hat{a}_{il}^{(n)(k)} p(t-nT_b-\tau_{il}) c_i(t-\tau_{il}) \quad (5)$$

wherein $A_{il}$ is the estimated value of $a_{il}\sqrt{P_i}$.

The MAI of $i^{th}$ user $\hat{I}_i^{(k)}$ is obtained by accumulating regenerated signals of other users, that is $$\hat{I}_i^{(k)} = \sum_{j=1, j \neq i}^{N} g_j^{(k)}(t). \quad (6)$$

By partly removing the MAI from the baseband signal of the received signal of the user, an output signal of this stage of the user $r_i^{(k+1)}(t)$ is obtained with the following formula, and the $r_i^{(k+1)}(t)$ is an input signal of the de-spreader of next stage of the user in the PIC structure, $$r_i^{(k+1)}(t) = r(t) - p^{(k)} \hat{I}_i^{(k)} \quad (7)$$

wherein $p^{(k)}$ is the weighted value of the $k^{th}$ stage, $0 \leq p^{(k)} \leq 1$ and $p^{(1)} < p^{(2)} \ldots < p^{(s)}$; s is the number of the stages of the PIC structure; since all the processing above is for first stage, so k=1 for all of them and $r_i^{(1)}(t) = r(t)$.

Step b: In any $k^{th}$ middle stage of the PIC structure, first, the output signal of last stage of the user $r_i^{(k-1)}(t)$ is de-spread to obtain the multipath de-spread result of this stage; the front-back stage combiner of this stage 410 combines the multipath de-spread result of this stage and the multipath de-spread result of last stage with the following formula; the result of said combination is sent to the channel estimation and multipath combiner 411, on the one hand, and to the front-back stage combiner 410 of next stage of this user, on the other hand.

$$Y_{ilc}^{(m)(k)} = Q_i^{(k)} Y_{il}^{(m)(k)} + (1-Q_i^{(k)}) Y_{ilc}^{(m)(k-1)}, \quad (8)$$

wherein the $Y_{ilc}^{(m)(k)}$ is the multipath de-spread result of the $m^{th}$ symbol of the $l^{th}$ path of the $k^{th}$ stage of the $i^{th}$ user; $Q_i^{(k)}$ is a combined coefficient, $0 < Q_i^{(k)} < 1$, $Q_i^{(1)} < Q_i^{(2)} < \ldots < Q_i^{(S)}$ and S is the number of stages; the optimal combined coefficient can be defined by experiment under different SNR or $Q_i^{(k)} = 0.5$ is taken uniquely as the combined coefficient.

Then, the multipath de-spread result having been combined is taken to make channel estimation and multipath combination, and the multipath combined result $Y_i^{(m)(k)}$ is obtained by the formula (2). The hard decision is calculated by the formula (3); and the reliability coefficient of the hard decision is obtained by the formula (4). The MAI of the $i^{th}$ user is obtained by the formula (6), and the multiple address interference of baseband signal of the received signal of the $i^{th}$ user is partly removed by the formula (7) to obtain an output signal of this stage of the $i^{th}$ user; said output signal is sent to next stage as an input of its de-spreader.

Step c. In the final stage, the output signal of last stage is de-spread to obtain the multipath de-spread result of this stage. The multipath de-spread result of this stage and the multipath de-spread result of last stage of the user is combined according to the formula (8), and the combined result is taken to make channel estimation and multipath combination to obtain the soft output of the user, which is the final output of the multiple stages of the PIC structure for the $i^{th}$ user.

In the above PIC structure, calculation of hard decision, the reliability coefficient of the hard decision and interference cancellation are not limited by the above embodiment. Each calculation can be made with other method, for example, soft decision calculation and—soft decision weighting calculation can be made according to the multipath combined result, and—interference cancellation can be calculated without weighting.

The invention claimed is:

1. A Parallel Interference Cancellation (PIC) method, comprises, in the first stage of PIC, making multipath de-spread, channel estimation and multipath combination for a user input signal by a RAKE receiver, sending a multipath de-spread result to next stage, making estimation and cancellation of Multiple Address Interference (MAI) of the user of this stage based on a multipath combination result and a channel estimation result, and obtaining an output signal of the said user of this stage;

in any middle stage of PIC, making multipath de-spread for output signal of last stage to obtain a multipath de-spread result of this stage, combining the multipath de-spread result of this stage and that of last stage of the said user to obtain a combined multipath de-spread result, sending the combined multipath de-spread result to next stage;

making channel estimation and multipath combination of this stage based on the combined multipath de-spread result, and then making estimation and cancellation of Multiple Address Interference (MAI) of this stage of the said user based on the multipath combination result and the channel estimation result of this stage, and obtaining an output signal of the said user of this stage;

in the final stage of PIC, making multipath de-spread for output signal of last stage to obtain a multipath de-spread result of this stage, combining the multipath de-spread result of this stage and that of said last stage of the said user to obtain a combined multipath de-spread result, making channel estimation and multipath combination based on the combined multipath de-spread result to obtain a soft output of the said user.

2. The Parallel Interference Cancellation (PIC) method according to claim 1, the step of combining the multipath de-spread result of this stage and that of last stage of the said user comprises, combining the multipath de-spread result of this stage and that of last stage by a formula $$Y_{ilc}^{(m)(k-1)}$$

wherein, $y_{il}^{(m)(k)}$ is a de-spread result of $m^{th}$ symbol of $l^{th}$ path of $i^{th}$ user in the $k^{th}$ stage of PIC before combination, and $$Y_{ilc}^{(m)(k-1)}$$

is a de-spread result of $m^{th}$ symbol of $l^{th}$ path of $i^{th}$ user in last stage; and then $Y_{ilc}^{(m)(k)}$ is a combined de-spread result of $m^{th}$ symbol of $l^{th}$ path of $i^{th}$ user in $k^{th}$ stage of PIC; $Q_i^{(k)}$ is a combined coefficient, $0 \leq Q_i^{(k)} \leq 1$, $Q_i^{(1)} \leq Q_i^{(2)} \leq \ldots \leq Q_i^{(S)}$, wherein S is the number of stages and k is greater than 1.

3. The Parallel Interference Cancellation (PIC) method according to claim 1, the step of making estimation and cancellation of MAI based on the multipath combination result and the channel estimation result further comprises, making decision calculation based on the said multipath combination result;

calculating a regenerated signal based on the decision calculation result and the channel estimation result;

accumulating regenerated signals of other users to calculate the MAI of the said user;

removing the said MAI from the user input signal to obtain an output signal of this stage of the said user.

4. The Parallel Interference Cancellation (PIC) method according to claim 3, the decision calculation is a hard decision calculation or a soft decision calculation.

5. The Parallel Interference Cancellation (PIC) method according to claim 1, the step of making estimation and cancellation of MAI based on the multipath combination result and the channel estimation result further comprises, calculating a hard decision based on the multipath combination result, and calculating a reliability coefficient of the hard decision result based on the said multipath combination result and the said channel estimation result;

calculating a regenerated signal based on the hard decision result, the reliability coefficient and the said channel estimation result;

accumulating regenerated signals of other users to calculate MAI of the said user;

removing the said MAI from the user input signal to obtain an output signal of this stage of the said user.

6. A parallel interference cancellation device that is a multiple stages of structure; of which a first stage of the PIC includes N first stage user processing units and a first stage MAI estimation and interference cancellation device, any middle stage of the PIC includes N user processing units and a MAI estimation and interference cancellation device, and a final stage of the PIC structure includes N final stage user processing units; wherein the first stage user processing unit includes a RAKE receiver, a decision unit and a signal regenerator; the RAKE receiver receives an input signal of a user and makes multipath de-spread, channel estimation and multipath combination; a multipath combination result is sent to the decision unit, and a channel estimation result is sent to the signal regenerator, and a multipath de-spread result is exported to a front-back stage combiner of next stage; a decision result of the decision unit is sent to the signal regenerator and a regenerated signal of said signal regenerator is sent to the first stage MAI estimation and interference cancellation device that makes estimation and cancellation of MAI and outputs the said user output signal of this stage;

the middle stage user processing unit includes a de-spreader, a front-back stage combiner, a channel estimation and multipath combiner, a decision unit and a signal regenerator; the de-spreader makes multipath de-spread for the said user output of the last stage MAI estimation and cancellation device to obtain a multipath de-spread result of this stage; the front-back stage combiner combines a multipath de-spread result of this stage and that of last stage of the said user to obtain a combined result, and then sends it to the said channel estimation and multipath combiner and a front-back stage combiner of next stage of the said user; a multipath combination result of the channel estimation and multipath combiner is sent to the decision unit, and a channel estimation result of the channel estimation and multipath combiner is sent to the signal regenerator; a decision result from the decision unit is sent to the signal regenerator, and a regenerated signal is sent to the MAI estimation and interference cancellation device of this stage, which makes estimation and cancellation of MAI and outputs the said user output signal of this stage;

the final stage user processing unit includes a de-spreader, a front-back stage combiner and a channel estimation and multipath combiner; the de-spreader makes multipath de-spread for the said user output of last stage MAI estimation and cancellation device to obtain a multipath de-spread result of this stage; said front-back stage combiner combines the multipath de-spread result of this stage and that of last stage of the said user to obtain a combined result, the combined result is sent to the channel estimation and multipath combiner, which makes channel estimation and multipath combination for the combined result and then outputs a final output signal of this user.

7. The parallel interference cancellation device according to claim 6, the first stage user processing unit further includes a reliability coefficient generator; the multipath combination result and the channel estimation result of the RAKE receiver are sent to the reliability coefficient generator, respectively, and a result of said reliability coefficient generator is sent to the signal regenerator.

8. The parallel interference cancellation device according to claim 6, the middle stage user processing unit further includes a reliability coefficient generator; the multipath combination result and the channel estimation result of the channel estimation and multipath combiner are sent to the reliability coefficient generator, respectively, and a result of said reliability coefficient generator is sent to the signal regenerator.

9. The parallel interference cancellation device according to claim 6, the decision unit is a hard decision unit or a soft decision unit.

\* \* \* \* \*